United States Patent [19]

Vezzani

[11] 4,253,388

[45] Mar. 3, 1981

[54] METHOD AND MACHINE FOR COMPRESSING AND CUTTING RANDOM LOADED SCRAP METAL

[75] Inventor: Luciano Vezzani, Ovada, Italy

[73] Assignee: Officine Vezzani S.p.A., Milan, Italy

[21] Appl. No.: 28,153

[22] Filed: Apr. 9, 1979

[30] Foreign Application Priority Data

Apr. 12, 1978 [IT] Italy .................. 22234 A/78

[51] Int. Cl.³ ......................................... B30B 9/32
[52] U.S. Cl. .................................. 100/39; 83/923;
100/42; 100/98 R; 100/215; 100/232; 100/233;
100/295
[58] Field of Search .......... 100/232, 233, 295, 98 R,
100/42, 39, 95, 215; 83/923

[56] References Cited

U.S. PATENT DOCUMENTS

| | | | |
|---|---|---|---|
| 2,360,487 | 10/1944 | Fullerton | 100/215 X |
| 3,101,045 | 8/1963 | Van Endert | 100/95 X |
| 3,141,401 | 7/1964 | Lindemann | 100/95 X |
| 3,273,493 | 9/1966 | Smiltneek | 100/95 |
| 3,283,697 | 11/1966 | Findlay | 100/95 |
| 3,945,315 | 3/1976 | Dahlem | 100/95 |
| 4,086,850 | 5/1978 | Becker | 100/42 |

Primary Examiner—Billy J. Wilhite
Attorney, Agent, or Firm—Guido Modiano; Albert Josif; Lazar D. Wechsler

[57] ABSTRACT

A method for compressing and cutting random loaded scrap metal comprises the steps of gravity advancing scrap metal to a cutting zone, applying a first transversal compression to the scrap metal being advanced, guillotine cutting a portion of the scrap metal and concurrently applying a further transversal compression. The machine comprises a scrap metal conveying trough, a transversally movable pressing plunger adapted for traversing the conveying trough and compacting the conveyed scrap metal, a guillotine block for cutting the compacted scrap metal and a guillotine driven compacting block movable perpendicularly to the pressing plunger and cooperating therewith.

1 Claim, 6 Drawing Figures

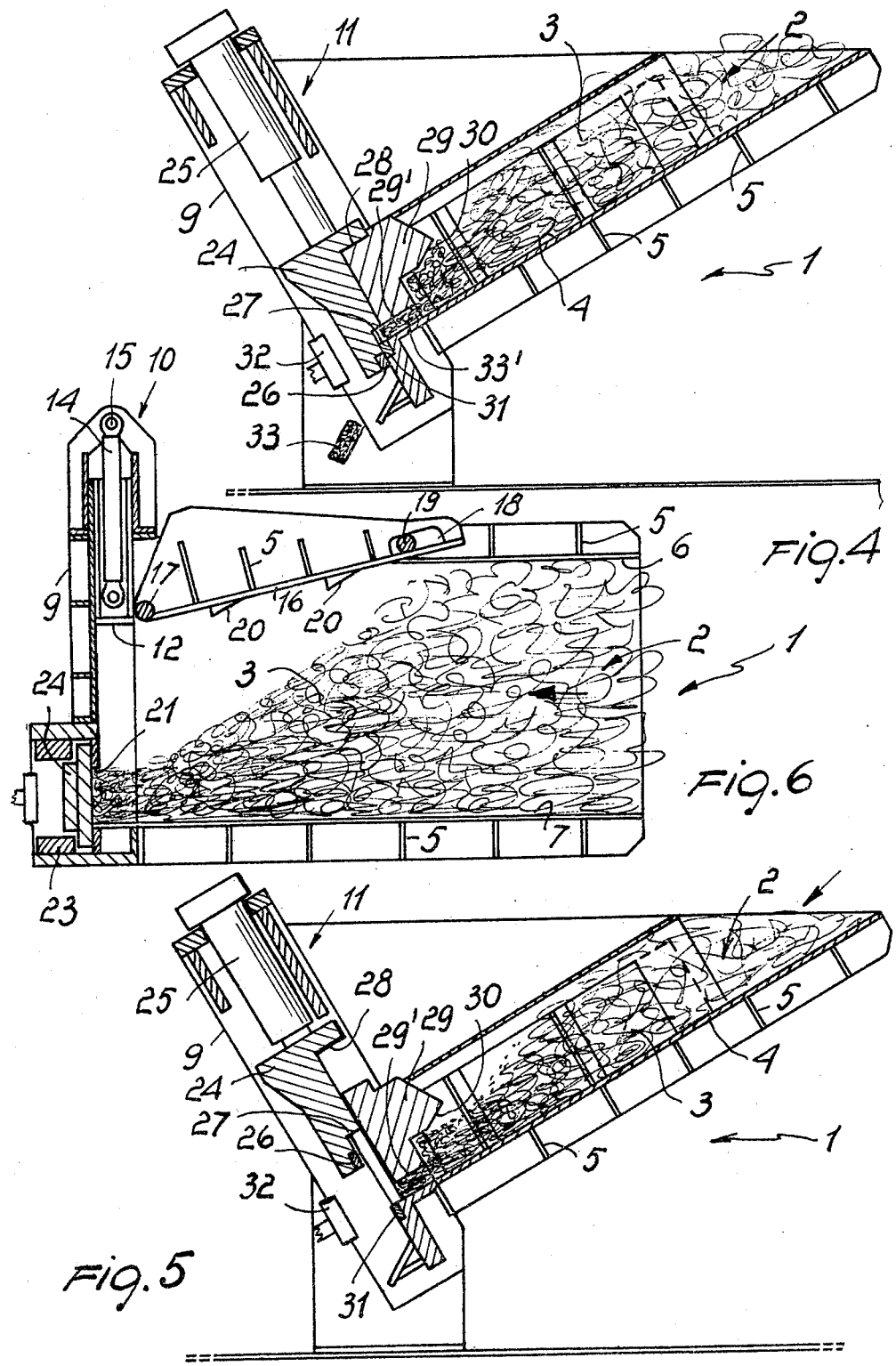

METHOD AND MACHINE FOR COMPRESSING AND CUTTING RANDOM LOADED SCRAP METAL

BACKGROUND OF THE INVENTION

This invention relates to a method and a machine for compressing and cutting random loaded scrap metal.

Known are presses and guillotine-presses for preparing charges of scrap metal. The presses of this kind comprise suitable dies providing three-dimensional compression to produce cubes, balls, and the like, of compacted scrap metal. A basic shortcoming of these machines is their absolute cycle discontinuity and the excessively long time required for each pressing cycle.

Modern guillotine-presses already represent a step forward in the direction of a more continuous type of operation, since they are equipped with a conveying line which speeds up the operation; the material being conveyed to an outlet where a guillotine performs spaced apart cuts, and the feed charge being picked up each time by a plunger type of pusher and moved forward and compacted simultaneously, generally for a limited number of cuts. It is this very step that slows down the production cycle.

Further deficiencies of a constructional and functional nature are then experienced, which largely result from the design of such conventional machines. For example, the cutting operation generates couples and rotational movements of the workpieces, and if the latter are not stopped near the guillotine, occasional stresses are generated in even remote faces, which may damage them or require excessive strengthening provisions. The side and lengthwise compressions require expensive moving parts, with added forces and only modest results, since the forces are divided over a large surface area.

SUMMARY OF THE INVENTION

It is a general object of this invention to overcome the shortcomings and deficiencies of the conventional guillotine-presses.

Within that general aim it is possible to arrange that the method for compressing and cutting scrap metal, according to the invention, provides a substantially continuous loading, advancing and compacting cycle for the scrap metal to be cut.

A further object of this invention is to provide a guillotine-press machine implementing the above method and avoiding the cited problems by virtue of a simple construction and reliable operation.

According to one aspect of the invention there is provided a method for compressing and cutting random loaded scrap metal, characterized in that it comprises the steps of causing scrap metal continuously to advance by gravity to a guillotine cutting station, in which the guillotine cutting direction is transverse to the direction of advancing of the scrap metal, applying a first compression to the scrap metal being advanced, the direction of said first compression being transverse to the advancing direction of the scrap metal and substantially parallel to a plane which is defined by the advancing direction and the perpendicular to said cutting direction, thereby said scrap metal is gradually gathered together towards said cutting station; guillotine cutting a portion of said scrap metal in the said cutting direction to sever compressed scrap metal downstream of the guillotine cut from compressed scrap metal upstream of the guillotine cut and applying concurrently with said cutting a further compression transverse to said advancing direction and perpendicular to the direction of said first compression, to the scrap metal already compressed by said first compression and located upstream of and near said guillotine cut.

According to the invention a machine for compressing and cutting random loaded scrap metal, comprising a scrap metal conveying trough, means for compacting the scrap metal conveyed from said conveying trough, and means for cutting the compacted scrap metal, is characterized in that said trough has a bottom with an inclination angle effective to provide a free gravity advancing of the scrap metal, and in that said means for compacting the scrap metal being advanced comprise a transversally movable plunger, said transversally movable plunger being adapted for traversing said conveying trough and engaged with a movable side panel and for movement from a position of alignment with one wall of said trough to a position of convergence to said outlet, and a compressing block movable perpendicularly to said plunger and positioned adjacent said means for cutting the compacted scrap metal.

BRIEF DESCRIPTION OF THE DRAWINGS

The invention features and advantages will be more fully explained in the following detailed description of a presently preferred, though not limitative, embodiment thereof, with reference to the accompanying drawings.

In the drawings, the following figures illustrate schematically:

FIGS. 3 and 6 plan sectional views similar to that of FIG. 2, but at different working stages; and FIGS. 4 and 5, the same machine as shown in FIG. 1, but at different working stages.

DESCRIPTION OF THE PREFERRED EMBODIMENTS

Figure 1:
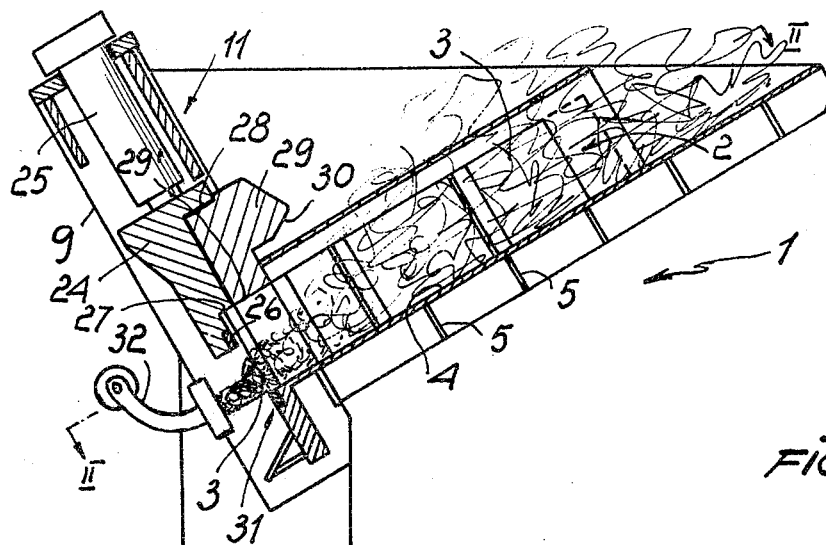
FIG. 1 a longitudinal section, in elevation, of a guillotine-press according to the invention taken along line I—I of FIG. 2.
Figure 2:
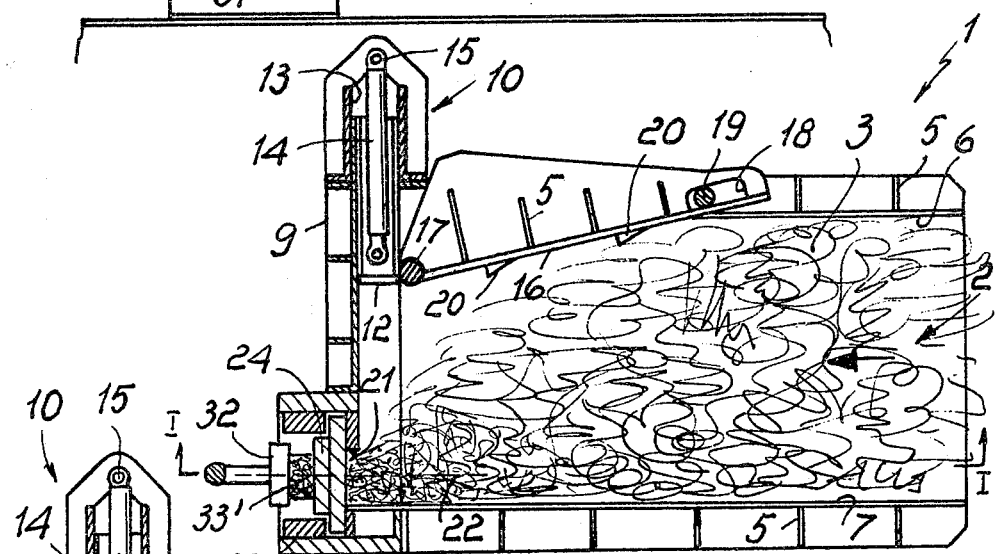
FIG. 2 a plan sectional view of that same machine taken along line II of FIG. 1.

A machine for compressing and cutting scrap metal, or guillotine-press, is shown in FIGS. 1 and 2 during the scrap metal advance or feeding movement by gravity, prior to the lateral compression step, and is generally indicated at 1. It comprises essentially a feeding trough or box 2, wherealong the ferrous random scrap metal 3 is conveyed by gravity and consolidated through its own weight. Said trough is arranged with its axis inclined, e.g. at an angle of 30°, and has a substantially rectangular cross-section with the major side laying horizontal. The trough walls include a bottom 4 forming the inclined surface whereon the material flows and strengthened by cross ribs 5 and two side walls 6 and 7 also provided with strengthening ribs 5. The trough is open at the top and forms a natural discharge hopper with a horizontal outlet. At the bottom, the trough 2, along a section normal to its axis, ends against a frame 9, which functions as a gate or bottom wall provided with an outlet port for the trough, and as a housing for a lateral compression device 10, which compresses the scrap metal in a direction substantially transverse to the feeding direction and an upper guillotine type, impact compression device 11, which acts in a downward direction substantially perpendicular to the direction of compression provided by the lateral compression device 10. The device 10 comprises a pressing plunger or piston 12 which is arranged for sliding along a hollow guide 13 of the frame 9, under the action of a dynamic cylinder 14 anchored to the frame 9 by means of a trunnion 15. The device 10 further comprises a movable side panel 16, which constitutes an oblique portion of the side wall 6. Said movable side panel 16 is hinged along one side to the plunger 12, by means of a hinge 17, and along its other side is connected through a slot 18 to a pin 19 rigid with the stationary portion of the wall 6. From the wall 16, claw webs 20 project to prevent the scrap metal 3 from sliding rearwards against the wall and entrain it when closed.

An outlet 21 for the material, having an axis 22 (FIG. 2), is crossed by uphill slide guides 23, wherein a guillotine block 24 forming a part of said device 11 is slidable in a direction substantially perpendicular to the feeding direction of the scrap metal. Said guillotine block is driven by a powerful dynamic cylinder 25 rigidly affixed to the frame 9. The guillotine block 24 carries a blade 26 at its bottom inner corner edge and features an abutment 27 adapted for prior squeezing the material presented for cutting, and an entrainment surface 28 which protrudes above a compacting block 29, which is driven downwards under the thrust applied by the surface 28, as an integral assembly together with the guillotine block 24. The compacting block 29 has an impact surface 29' flush with the abutment 27 and a nose profile 30 projecting further up to precompress scrap metal in the proximity of the outlet 21, of the frame 9, in the trough. The compacting block is also guillotine driven, along guides, not shown. With the blade of the guillotine 26, a counter-blade 31 cooperates which is attached to the frame 9. In front of the outlet 21, there is arranged a stop member 32 for the advanced scrap metal, which defines a suitably adjustable abutment surface.

The method steps and the machine operation are as follows.

Figure 3:
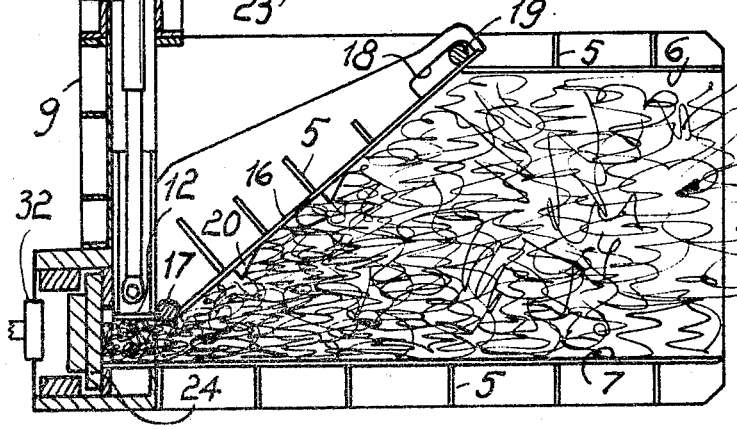

As mentioned, FIGS. 1 and 2 illustrate the initial step or stage of a compression and cutting cycle. The material, already compacted in the previous cycle, and urged along by the overlying material, is moved to contact the stop member 32. The next step is illustrated in FIG. 3 and sees the device 10 at work: the plunger 12 has been driven to its stroke end by the cylinder 14, until it marginally interferes with the outlet 21, to provide a powerful first compression of the material in the region before the outlet 21, i.e. upstream of, and near to, the cutting station defined by block 24 and blades 26 and 31. Simultaneously to the above, the plunger has driven the side panel 16, crosswise and obliquely, to throttle the trough 2, thus gradually compressing the scrap metal and gathering it toward the region before outlet; being constrained sideways, the material is not advanced forward during this step.

Thereafter, as shown in FIG. 4, after the plunger 12 has completed its stroke, the guillotine block 24 is dropped rapidly which, with its blade carrier tip further squeezes the top of the already compacted solid mass and cuts a briquette 33 off it, which drops into a collector, not shown. In the meantime, the guillotine block and compacting block apply a second compression to the scrap metal in a direction substantially perpendicular to the direction of the first compression applied by plunger 12 and substantially parallel to the cutting direction upstream of, and near to, the guillotine cutting station, and make ready, together with the surfaces 27 and 29', a squeezed and compacted portion corresponding to the next briquette 33'. This operation is a feature of the invention, wherein a briquette is made sequentially ready for cutting with the same movement which effects the cutting of the previous briquette, and the following scrap metal is gradually compacted funnel-fashion; thus, by pressing the scrap metal close to the cutting station, adverse and inconvenient movements thereof are avoided. It will be noted from the drawings that compression of the scrap metal close to the cutting station by plunger 12 and block 29 occurs according to concurrent directions. FIG. 5 shows the subsequent return stroke of the guillotine block, with slight advance with respect to the block 29; thus, any likely entrainment of chips into the slot is avoided, and the friction on the guides can be reduced. At the next step, which completes the cycle and brings the cutter back to its starting conditions, the block 29 is returned as in FIG. 1, while at the same time the plunger 12 is moved away from the outlet, thus returning the side panel 16 to the starting position, as shown in FIG. 6. The difference from what is shown in FIG. 2 is the arrangement of the material 3, which has had no time to move since the compression has been relieved: the material will move forward then, by gravity, to the position of FIG. 2, thereby the already compressed leading end to be cut off is also moved forward beyond the cutting station.

The technological and functional improvements and techniques described hereinabove afford continuous operation capabilities, e.g. by means of a belt conveyor, bucket, or magnet, independently of the cutting step, and since the cutter or guillotine is allowed to move up and down without the hindrance of loading, pre-compaction, and squeezing times, a real continuous cycle machine is provided in practice.

All this has led to the surprising result that the production has been more than doubled over conventional guillotines of comparable power, while reducing the manufacturing, operating and maintenance costs as well.

The invention lends itself to several modifications and variations without departing from the spirit and scope thereof, as defined by the concept disclosed and in the appended claims.

I claim:

1. A method for continously compressing and cutting random scrap metal, comprising the steps of feeding random scrap metal continously by gravity to a guillotine cutting station in which the scrap metal is cut in a direction substantially perpendicular to the feeding direction of the srap metal, applying a first compression to the scrap metal in a region upstream of, and near to, said guillotine cutting station in a direction substantially transverse to the feeding direction of the scrap metal and substantially perpendicular to the cutting direction, applying a second compression to the scrap metal in a direction substantially perpendicular to the direction of said first compression and substantially parallel to said cutting direction upstream of, and near to, said guillotine cutting station and simultaneously cutting a portion of scrap metal previously compressed in said first and second compression step and advanced beyond said guillotine cutting station, wherein concurrently with said first compression step the scrap metal is gradually compressed upstream of said region of said first compression in the direction of said first compression such as to gradually gather the scrap metal toward said region, and wherein said first and second compression steps are carried out according to concurrent directions.

* * * * *